United States Patent Office 3,755,568
Patented Aug. 28, 1973

3,755,568
PROCESSES FOR MAKING COMPETITIVE INHIBITION AGENTS AND PRODUCTS THEREOF
Sol Roy Rosenthal, Box F, Rancho Sante Fe, Calif. 92067
Continuation-in-part of application Ser. No. 720,751, Apr. 10, 1968, which is a continuation-in-part of application Ser. No. 587,669, Oct. 19, 1960. This application Nov. 5, 1970, Ser. No. 87,252
Int. Cl. A61k 27/00
U.S. Cl. 424—177
5 Claims

ABSTRACT OF THE DISCLOSURE

There is disclosed a process for providing in vitro a competitive inhibition agent or competitin for inhibiting the action in vivo of a material such as tissue injury toxins, the process comprising first subjecting the material to freezing and thawing and heating and thereafter subjecting the material to sonication or high pressure or enzymatic action, thus to produce a competitive inhibition agent that competes in vivo with the material for the receptor sites on target cells.

---

This application is a continuation-in-part of Ser. No. 720,751, filed Apr. 10, 1968, which in turn was a continuation-in-part of Ser. No. 587,669, filed Oct. 19, 1966, both now abandoned.

The present invention is directed to processes for producing in vitro competitive inhibition agents or competitins for inhibiting the action in vivo of a material, and the products resulting from those processes.

Certain materials when applied to living cells produce toxic effects thereon and even the death thereof by filling and occupying receptor sites on the target cells, examples of such materials being tissue toxins such as those derived from burned skin or liver or cancerous tissue, bacterial toxins such as those of diphtheria and tetanus and botulism, and venoms and poisons such as those derived from snakes. In accordance with the present invention, these materials are processed first to prepare them for subsequent treatment by subjecting them to alternative cycles of thawing, heating and freezing and thereafter treating the materials to sonication, or high pressure such as in a French press, or enzymatic action, whereby to provide therefrom a competitive inhibition agent or competitin. The competitive inhibition agent competes with the original material from which it is derived at least partially to fill the receptor sites on target cells, and by this competition for the receptor sites on target cells to inhibit or depress or otherwise interfere with the action of the material, and thus to reduce or essentially eliminate the deleterious effect thereof upon the target cells.

Accordingly, it is an important object of the present invention to provide a process for producing in vitro a competitive inhibition agent or competitin for inhibiting the action in vivo of a material deleterious to target cells, the process comprising the steps of freezing the material at a temperature of about −10° C. and below, heating a suspension or solution of the material in a carrier to a temperature in the range from about 75° C. to about 100° C. for at least about 30 seconds, subjecting the suspension to sonic energy at a frequency in the range from about 5,000 cycles per second to about 50,000 cycles per second, the sonic energy being applied to the suspension or solution at a temperature in the range of about 5° C. to about 50° C. for a time interval of at least about 15 minutes and at an energy level of at least 1 watt/sq. cm., and thereafter removing the competitive inhibition agent from the suspension.

In connection with the foregoing object, another object of the invention is to provide a process of the type set forth wherein the material is frozen for at least about 24 hours, then the sonic energy is applied for a time interval of from about 15 minutes to about 2 hours and at an energy level of from about 1 watt/sq. cm. to about 100 watts/sq. cm.

Another object of the invention is to provide a process of the type set forth wherein the suspension or solution of the material in the carrier instead of being subjected to sonic energy is subjected to high pressures on the order of 15,000 p.s.i. to 20,000 p.s.i. and thereafter suddenly reducing the pressure to atmospheric pressure, a suitable device for applying the pressure being a French press.

Another object of the invention is to provide a process of the type set forth wherein the suspension or solution of the material in the carrier instead of being subjected to sonic energy is subjected to enzymatic action by an enzyme selected from the group consisting of trypsin and collogenase.

Another object of the present invention is to provide a process of the type set forth wherein the material is a tissue which prior to the heating step is cut into small pieces having dimensions on the order of a few millimeters such as from about 2 mm. to about 5 mm.

Another object of the invention is to provide a process of the type set forth wherein the material treated is a bacterial toxin selected from the group consisting of diphtheria toxin, tetanus toxin, and botulism toxin.

A further object of the invention is to provide competitive inhibition agents or competitins for inhibiting the activity in vivo of the materials from which they are processed, the competitive inhibition agents or competitins being formed in vitro by one of the improved processes of the present invention.

Further features of the invention pertain to the particular arrangement of the steps of the processes and the characteristics of the products produced thereby whereby the above-outlined and additional operating features thereof are attained.

The invention, both as to its organization and method of operation, together with further objects and advantages thereof will best be understood by reference to the following specification taken in connection with the accompanying drawings, in which:

The following is an example of a competitive inhibition agent useful in competing with a burn toxin for the receptor sites on target cells to inhibit the action of the burn toxin on the target cells. There is disclosed not only the process for producing the competitive inhibition agent, but also the burn toxin from which the same is produced, together with the improved method of the present invention for producing the competitive inhibition agent from the burn toxin, all the processes being carried out in vitro.

EXAMPLE 1

The first portion of the process will be described in connection with the following Flow Chart No. 1:

Human skin tissue obtained either from autopsy or from surgery was frozen within 5 hours after the death of the individual or the part and stored at −20° C. until used. The skin tissue was disected, full thickness skin, free from subcutaneous fat and cut into small fragments having dimensions on the order of from about 2 mm. to about 5 mm., the preferred size being 3 mm. to 4 mm. Fifty grams of the skin was thawed and placed in 100 ml. of a 0.9% sodium chloride aqueous solution (biological saline solution) and heated with continuous stirring to a temperature of 96° C. for 30 seconds. The suspension was then placed in a Waring blender and homogenized at 3,000 r.p.m. for 15 minutes. The homogenized mixture was then decanted through cheesecloth to remove extraneous material such as hair, and thereafter centrifuged at 1000G (1000 times the force of gravity) for 5 min. at room temperature.

There resulted three separate fractions, namely, a very thin yellow fatty floating layer (Code 1), a pellet consisting mostly of large particles (Code 2), and a dominant supernatant middle layer (Code 3).

The product identified as Code 3 was divided into two portions, the first portion of which was further treated as indicated to the left on Flow Chart No. 1, the second portion being treated as indicated on Flow Chart No. 2. Referring first to Flow Chart No. 1, the first portion was rehomogenized and then centrifuged at 4700G for 15 minutes at room temperature. There resulted a residue which was discarded and a supernatant layer (Code 4).

The product identified as Code 4 is a toxin, and more specifically is a tissue injury toxin, namely a burn toxin. Male Swiss mice having a weight of 18 to 20 grams were injected intravenously into the lateral veins with 0.2 ml. of the Code 4 solution. Death usually occurred within 5 to 10 minutes, but some animals lived as much as 30 minutes and even 24 hours. Usually the animals that survived after 30 minutes continued to live, but these animals exhibited convulsions, ataxia and failing. Only those animals that died within 30 minutes were recorded as being killed by the toxin, whereby all data represent lethality and not merely toxicity, products that killed at least 40% of the injected animals being considered lethal. Controls for the lethality tests were injections of like amounts of a 0.9% sodium chloride aqueous solution. Tests involving 118 animals injected with the product Code 4 resulted in a lethality of 87.7% of the animals receiving an average dose of 2.0 mg.

The second portion of the supernatant product (Code 3) from Flow Chart No. 1 was then treated in accordance with Flow Charts No. 2A and 2B, Flow Chart No. 2A being as follows:

Referring to Flow Chart No. 2A, the supernatant liquid product (Code 3) was extracted with one part of the following mixture: 0.9% sodium chloride solution in water, glacial acetic acid, and butanol in the ratio 5:1:5. After vigorous agitation for 20 minutes at room temperature, the mixture was centrifuged at 1600G for 20 minutes. Centrifugation separated the mixture into four layers: an upper organic phase containing alcohol soluble lipids and fatty material; an insoluble precipitate middle ring (1) that was grayish-white in color and contained some denatured protein, nucleic acids and lipoproteins; an aqueous phase $II_1$ containing soluble proteins, necleotides, glycoproteins and glycopeptides; and a bottom precipitate (1) that was a white-gelatinous and viscous layer containing a heterogenous mixture that was collogeneous and polysaccharide in nature. The aqueous phase $II_1$ was carefully pipetted out and was treated in accordance with Flow Chart No. 3 as follows:

The precipitate middle ring (2) and the bottom precipitate (2) were pooled and further processed as illustrated in the following Flow Chart No. 2B:

FLOW CHART NO. 2B

Purified Burn Toxic Factor
(PBTF) (a Glycoprotein)

FLOW CHART NO. 3

Burn Toxic Factor

Referring to Flow Chart No. 3, aqueous phase $II_1$ was evaporated to dryness under vacuum at 22° C. The resultant residue was dissolved in one part of distilled water and dialyzed against large volumes of 0.9% sodium chloride solution overnight at a temperature of 0° C. to 40° C. The contents of the dialysis bag were clarified by centrifugation at 10,300G for 30 minutes. The resultant clear solution was a burn toxic factor as was determined in a manner like that described above with respect to Code 4.

Referring again to Flow Chart No. 2A, the precipitate middle ring (1) and the bottom precipitate (1) were pooled and then suspended in one part of 0.9% sodium chloride solution and extracted with one part of the following mixture: 0.9% sodium chloride solution in water, glacial acetic acid, and butanol in the ratio 5:1:5. After vigorous agitation for 20 minutes at room temperature, the mixture was centrifuged at 1600G for 30 minutes, centrifugation separating the mixture into 4 layers: an upper organic phase, an insoluble precipitate middle ring (2); an aqueous phase $II_2$; and a bottom precipitate (2). The aqueous phase $II_2$ was processed in accordance with Flow Chart No. 3 as described above and there was produced therefrom a burn toxic factor as was demonstrated in a manner like that described above with respect to Code 4.

The pooled precipitate middle ring (2) and the bottom precipitate (2) were suspended in one part of 0.9% sodium chloride solution at 22° C., and the pH adjusted to a value within the range of 7.8 to 8.0, after which 5 mg. of trypsin was added for each 50 ml. of solution. The resultant mixture was incubated first at room temperature for 2 hours with stirring, and then at 4° C. for 18 hours. Thereafter the mixture was concentrated under vacuum to a thick gel, after which it was extracted with 105 parts of the following mixture: 0.9% sodium chloride in water, glacial acetic acid, and butanol in the ratio 5:1:5. The mixture was shaken vigorously for 20 minutes at room temperature and thereafter centrifuged at 10,300G for 30 minutes. There resulted an upper organic phase, a precipitate middle ring (3), an aqueous phase $II_3$ and a bottom precipitate (3). The aqueous phase $II_3$ was carefully pipetted out and evaporated under vacuum to a moist residue. The residue was dissolved in two parts of distilled water and dialyzed against a large volume of 0.9% sodium chloride solution in the cold. The contents of the dialysis bag were clarified by centrifugation at 10,300G for 60 minutes. This clear solution was designated as the purified burn toxic factor (PBTF) and was found to be lethal to mice when injected intravenously into mice in amounts as small as 0.1 ml. using the method described above with respect to Code 4.

The purified burn toxic factor that is the end product on Flow Chart 2B from Example 1 above was then treated in accordance with the present invention to provide a competitive inhibition agent or competition that inhibited the activity of the purified burn toxic factor in vivo.

EXAMPLE 2

The purified burn toxic factor resulting from the process of Flow Chart No. 2B had applied thereto sonic energy from a Raytheon "Sonicator" operating at a frequency of 9,000 cycles per second at a total energy output of 150 watts applied to the purified burn toxic factor of an area of approximately 15 sq. cm. to produce an energy level of approximately 10 watts/sq. cm., the sonic energy being applied for one hour at a temperature of about 20° C. The sonicated product was designated "competition from purified burn toxic factor" (CPBTF).

The product CPBTF was non-lethal when injected into mice, which non-lethal character was tested by the intravenous injection thereof into male Swiss mice having weights in the range of 18 to 20 gms. The mice were injected intravenously into the lateral veins with 0.2 ml. of the product, the mice showing little or no signs of toxicity.

The competitive inhibition agent CPBTF further was effective to inhibit the activity of the purified burn toxic factor (PBTF). Mice injected with CPBTF and challenged with PBTF one hour later showed a 50% reduction in mortality as compared to mice not previously treated with CPBTF.

The sonication method described above as applied to the purified burn toxic factor can also be applied to the product Code 4 from Flow Chart No. 1 and the burn toxic factor derived from aqueous phase $II_1$ and aqueous phase $II_2$, thereby to produce therefrom a competitive inhibition agent therefor. These competitive inhibition agents also protect mice against the corresponding burn toxic factors.

It is believed that the purified burn toxic factors and the burn toxic factors from Code 4, aqueous phase $II_1$ and aqueous phase $II_2$ exert their toxic and lethal effect on certain target cells in the host animal, which target cells are sensitive to the burn toxic factors in that they have receptor sites that receive and/or are attacked thereby. If the receptor sites on these target cells are occupied or even partially occupied by the non-toxic competitive inhibition agent, subsequent exposure of these receptor sites to the burn toxin factor will result in a rejection of the burn toxic factor by the target cells. In this way, the harmful effects of the burn toxic factor are negated because the receptor sites have been at least partially occupied or blocked. In other words, the competitive inhibition agents compete with the burn toxic factor for the receptor sites on the target cells, whereby the name "competitin" aptly suggests the mode of operation of the competitive inhibition agents; in other words, the burn toxic factor and the competitive inhibition agents or competitins compete for the same receptor sites on the target cells.

In the process of Example 1 above, and referring first to the portion thereof illustrated in Flow Chart No. 1, the freezing step therein may be conducted at a temperature as high as −10° C. but the preferred range is from about −180 C. to about −20° C. or lower; the time of freezing is only that required to bring each portion of tissue to the desired temperature; a suitable and convenient time interval for freezing is about 24 hours, although longer times can be successfully utilized. The high temperature heating of the small pieces of skin may be carried out at temperatures as low as 75° C. and at temperatures above 96° C., and even up to 100° C., but preferably under the boiling point of the saline solution; if a lower temperature is utilized, then the heating time of 30 seconds should be extended, for example to about 3 minutes or more. In the homogenizing step, other equipment may be used in place of the Waring Blender given in Example 1, provided that a like degree of homogenizing action is obtained, it being understood that even when using the Waring Blender lower rates of blending may be utilized provided that the time of blending is correspondingly increased to provide the desired and necessary degree of homogenization. In the several centrifugation steps of Flow Charts No. 1, 2A and 2B, it will be understood that other forces may be applied for other lengths of time, so long as the desired degree of separation is achieved.

In the process of Example 2, it will be understood that other types of equipment may be utilized to provide the sonic energy. Further the time of exposure may be less than 1 hour, for example 15 minutes, but better results are obtained at the longer exposure times and even as long as several hours. The frequency of the sonic energy may be as low as 5,000 cycles per second and may even be above the 20,000 cycles per second level and as high as 50,000 cycles per second and still produce good results. The sonic energy further may be applied at a temperature ranging from about 5° C. to about 50° C. and at an energy level from about 1 watt/sq. cm. to about 100 watts/sq. cm.

In carrying out the process of Example 1 above, the alternate freezing, thawing and heating is a requisite to provide a successful process. For example, when the process was repeated as described, but omitting the step on Flow Chart No. 1 of heating to 96° for 30 seconds, i.e., the solution was simply allowed to stand at room temperature of 22° C., the resultant extracts Code 4, aqueous phase $II_1$, aqueous phase $II_2$ and the product from the bottom of Flow Chart No. 2B were found to produce no toxic symptoms and no lethality when injected into mice. It is believed that the alternate freezing, thawing and heating is required to prepare the materials for the sonication step, whereby to render the sonication step effective to produce the burn toxic factors.

Considering further the characteristics of the purified burn toxic factor, it was found that the PBTF in vivo inhibited the growth of HeLa and $HEP_2$ cells and a clumping or glutination of the original inoculated cells. The competitive inhibition agent made from PBTF not only does not inhibit growth of HeLa and HEP cells, but actually stimulates such growth.

Turning to the chemical nature of the purified burn toxic factor and the competitive inhibition agents or competitins formed therefrom, solutions of the PBTF in 0.9% sodium chloride solution did not show any specific absorption peak when analyzed in the ultraviolet range using a Beckman Model DU2 spectrophotometer. The lack of an absorption peak between the wave lengths of 2300 to 2650 angstrom units indicated the absence of purines, pyrimidines or nuclei acid. Also the lack of an absorption peak between the wave lengths of 2750 and 2880 angstrom units indicated the absence of tryptophan or tyrosine. Digestion of the PBTF with trypsin followed by chromatographic resolution on Whatman No. 1 filter paper produced traces of ninhydrin reacting compounds. Incubation of PBTF with collegenase followed by chromatographic resolution on Whatman No. 1 filter paper produced ninhydrin reacting compounds of hydroxyproline-containing peptides. The PBTF as well as the aqueous phase $II_1$ and $II_2$ reacted with anthrone sulfuric acid indicating high concentration of carbohydrate. The PBTF also gave the characteristic orange-red color when interacted with orcinol indicating the presence of polysaccharides. When interacted with diphenylamine sulfuric acid, the PBTF gave a weak bluish color also indicating the presence of polysaccharides. The color from the competitive inhibition agent produced from PBTF in accordance with Example 2 was at least 10 fold stronger.

Figure 1:
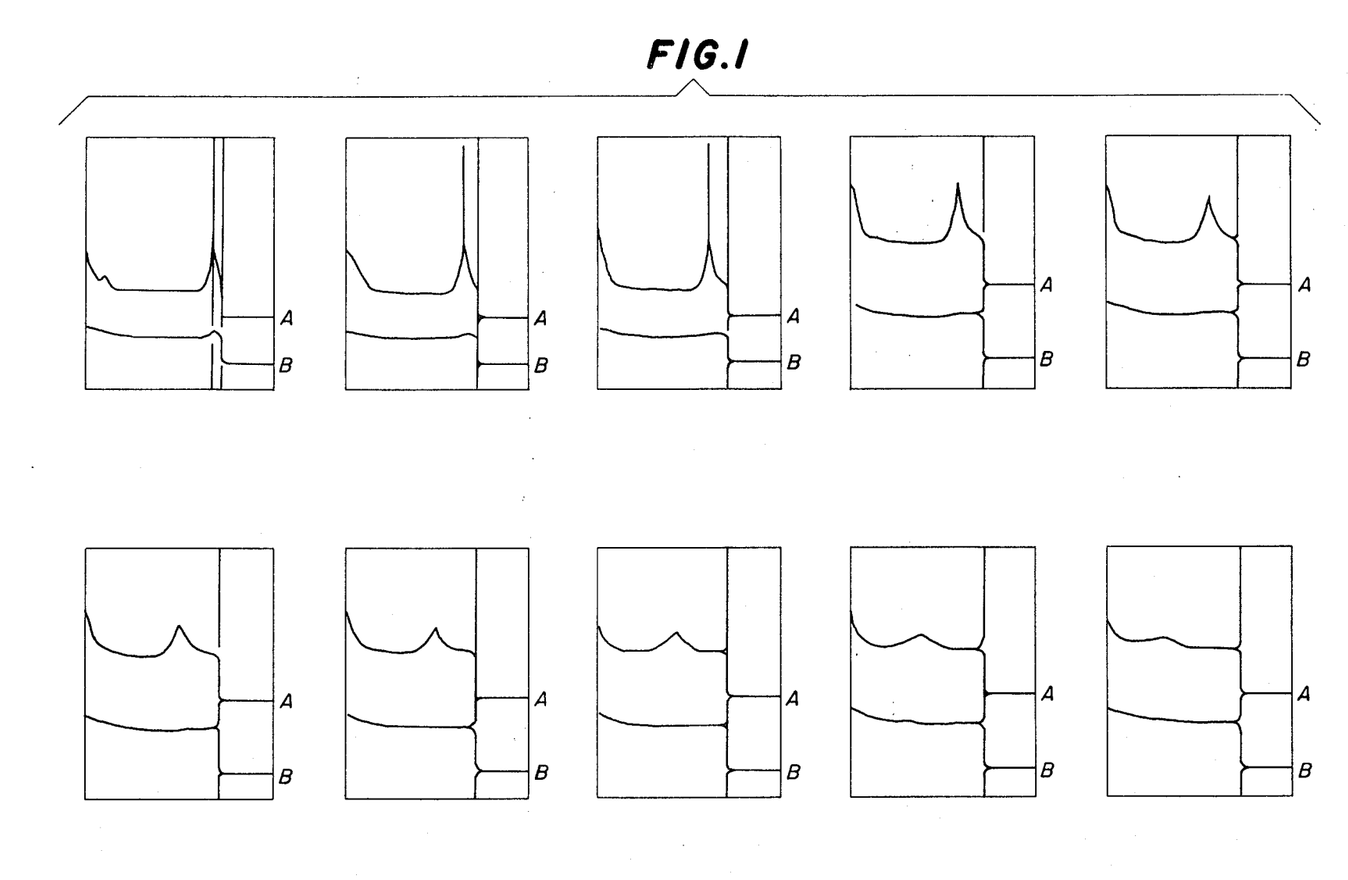
FIG. 1 is a series of graphs illustrating the sedimentation profile of the burn toxic factor extracted from scalded human skin in the upper curves and an extract from non-scalded human skin in the lower curves.

Referring to FIG. 1 of the drawings, there is there illustrated a series of curves depicting the sedimentation rate and profile for the purified burn toxic factor (the upper curves) from scalded human skin, and a comparison thereof with the extract obtained from cold or non-scalded human skin (lower curves). The sedimentation studies were carried out in 0.9% sodium chloride solution in an ultracentrifuge. Under these conditions one sedimenting material (the upper set of curves) had an average $S_w20$ value of 2.75, this material appearing to be heterogeneous as evidenced by the spreading of the peak, this being present only in the upper series of curves. The sedimentation pattern of the material extracted from cold or non-scalded human skin (the lower set of curves) showed no sedimenting component.

Figure 2A:
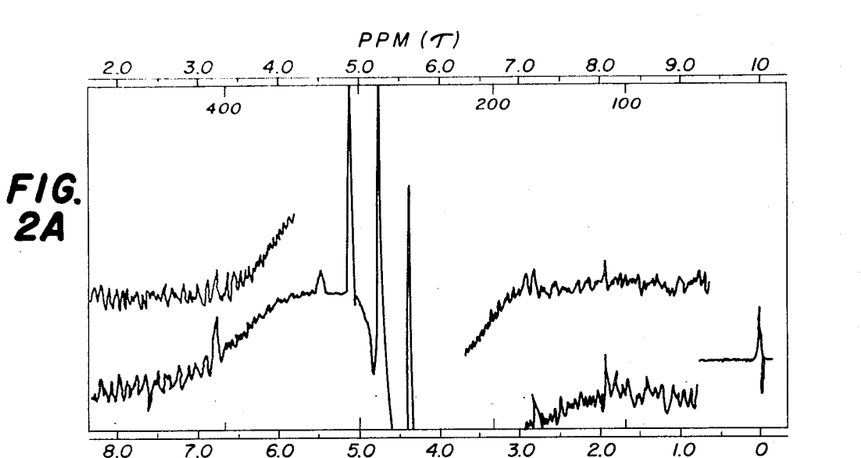
FIGS. 2A, 2B and 2C are graphs illustrating the nuclear magnetic resonance spectra respectively of the toxic factor Code 4 from scalded human skin, the purified toxic factor from scalded human skin, and the competitive inhibition agent derived from the purified toxic factor from scalded human skin made in accordance with the present invention.
Figure 2B:
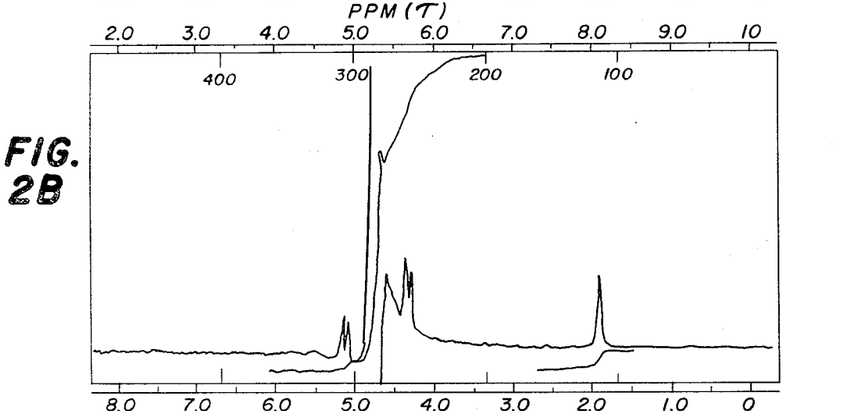
Figure 2C:
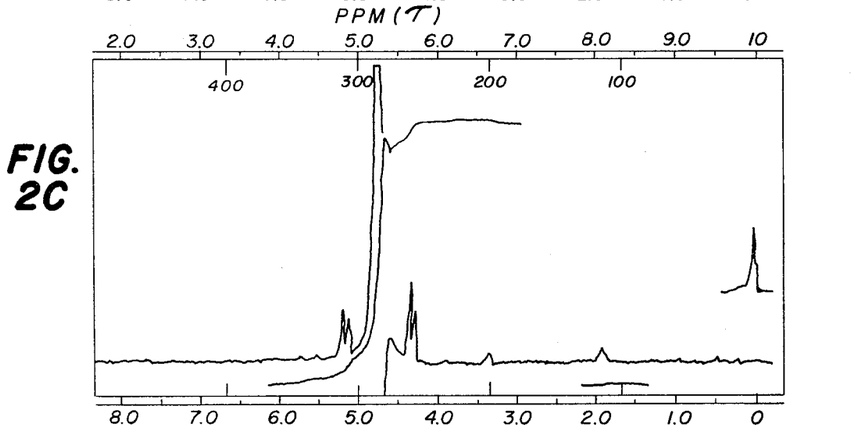
Figure 3A:
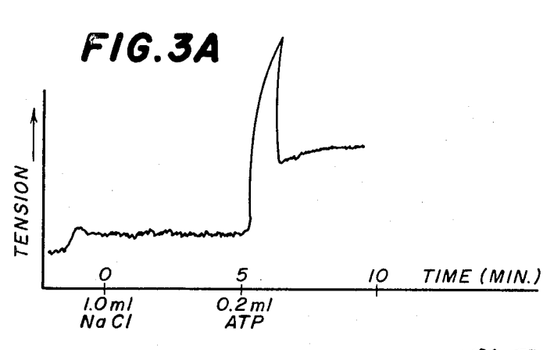
FIG. 3 is a series of graphs illustrating the effect upon ATP-induced contractions of glycerinated psoas muscle after the addition thereto of varying concentrations of purified burn toxic factor or toxic glycoprotein.
Figure 3B:
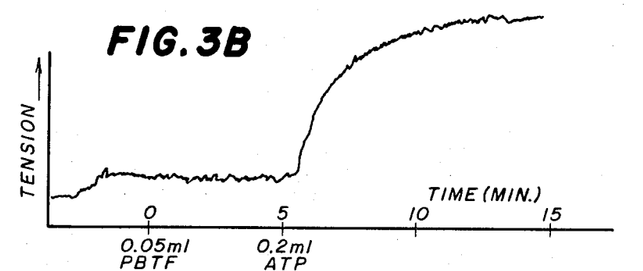
Figure 3C:
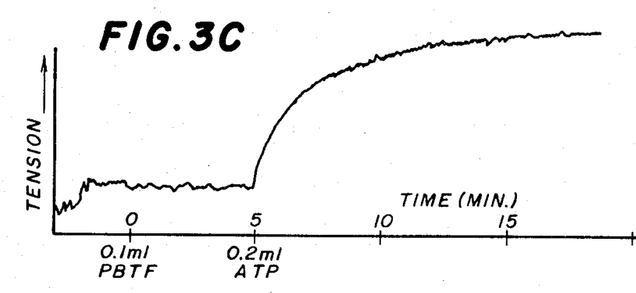
Figure 3D:
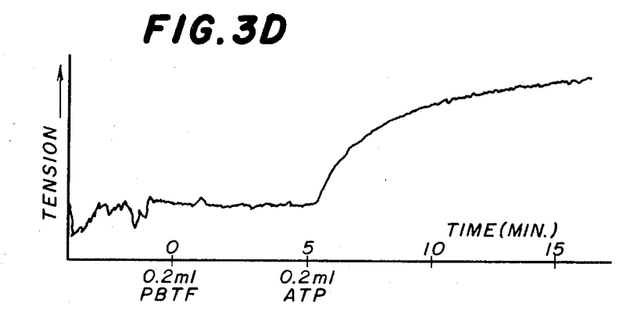
Figure 3E:
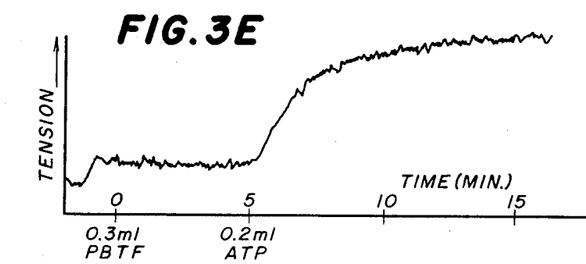
Figure 3F:
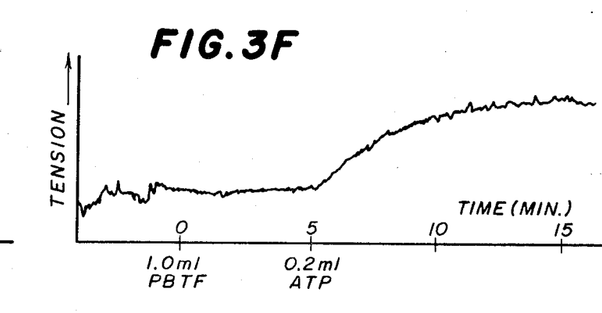

Referring to FIGS. 2A, 2B and 2C, the nuclear magnetic resonance spectra are given for three materials, Code 4 in FIG. 2A, the purified burn toxic factor in FIG. 2B, and the competitive inhibition factor or competition derived by sonication of the purified burn toxic factor in FIG. 2C. Code 4 and purified burn toxic factor gave bands suggesting the presence of active radicals resonating in the region of wave length 2.0. These spectra indicated that there has been a breakdown of the purified burn toxic factor with the release of at least one additional active radical in the region of wave length 3.5 after sonication, whereby the purified burn toxic factor has been altered at least partially by the sonication.

Polyacrylamide gel electrophoresis of the purified burn toxic factor showed a single band with an electrophoretic mobility similar to that of albumin, although it failed to react with a specific human antialbumin.

Recapitulating, the chemical studies show that the purified burn toxic factor consists of carbohydrates (a positive reaction to the anthrone test, the orcinol test and the phenosulfuric acid test), and peptides (collogenolytic hydrolyses yields hydroxyproline peptides). Also of significance are the facts that a single peak was obtained for sedimentation rate in the ultracentrifuge, a single peak was obtained in the nuclear magnetic resonance studies, and the results of the poly acrylamide gel electrophoresis. Accordingly, it is concluded that the purified burn toxic factor is a glycoprotein having a molecular weight of about 35,000.

Considering now the physiological action of the purified burn toxic factor on mice, it was observed that after intravenous injection of fatal doses of PBTF, there were a few minutes when no symptoms occurred, then jerky movements were noted, followed by lassitude and malaise. The animals lay on one side, had tonic and clonic convulsions, gasped for breath, urinated and died within a period of 5 to 10 minutes. Palpitation of the chest just before death revealed that the heart beat rapidly although respirations had stopped. On rare occasions when the PBTF was given in large doses, the animals bled from the nose.

Upon microscopic examination the most significant pathology was found in the heart, which pathology was similar whether the toxic factor of Code 4, aqueous phase $II_1$, aqueous phase $II_2$ or PBTF. The degree of myocardial pathology varied directly with the doses. The findings in the heart, as determined by light, consisted of muscle fiber degeneration and subendothelial and interstatial hemorrhages. Electron microscopic studies revealed that the myochondria had lost their outer membranes in places and the cristae and amorphic material were freed in interstatial spaces. Myofibrials in proximity seeming to undergo destruction as if attacked by the contents of the myocardia. The cross striations of the fibers were only partially reduced in the areas of fiber regeneration.

The mechanism of action of the purified burn toxic factor was then studied by determining the effect thereof on the profused isolated rat heart. Electrocardiagraphic tracings demonstrated such abnormal findings as splitting of the QRS complex and the inversion of the T wave.

In order further to demonstrate the mechanism of action of the purified burn toxic factor, the effect thereof on skeletal muscle contractile components was studied. Glycerinated rabbit psoas muscle fibers were prepared according to the method of Szent-Gyorgi (see his book entitled Molecular Contraction, Academic Press, New York City, 1953). Electron microscopic examination of these preparations showed them to be devoid of intact mitochondria and other features characteristic of skeletal muscle, the contractile elements being principally actomysin. Actomyosin in the presence of magnesium ion and adenosine triphoshate (ATP) will split the ATP to adenosine diphosphate (ADP) and shortening of the muscle fibers will ensue.

Referring to FIG. 3 of the drawings, there are reproduced recordings of the ATP-induced contractions of glycerinated psoas muscle for several different systems. In order to obtain the recordings of FIG. 3, a glycerinated psoas muscle was placed in a M solution of magnesium chloride in water buffered with 0.15 m. phosphate ion at a pH of 6.8, one end of the muscle being anchored and the other attached to a tension recording device. In FIG. 3A there is shown the effect of first adding to the solution in which the muscle is immersed a 1.0 ml. dosage of sodium chloride followed 5 minutes later with the addition of 0.2 ml. of ATP. The tension recorder recorded the typical reaction of the glycerinated psoas muscle to the addition of ATP to the environment thereof. FIGS. 3B through 3F show the effect of adding various concentrations of the purified burn toxic factor (PBTF) 5 minutes before the addition of the ATP to the medium containing the muscle. More specifically, FIG. 3B shows the effect of adding 0.05 ml. of PBTF to the medium, FIG. 3C shows the effect of adding 0.1 ml. of PBTF to the medium, FIG. 3D shows the effect of adding 0.2 ml. of PBTF to the medium, FIG. 3E shows the effect of adding 0.3 ml. of PBTF to the medium and FIG. 3F shows the effect of adding 1.0 ml. of PBTF to the medium. It will be noted that the amount of tension produced decreases as the amount of PBTF added to the medium is increased.

Figure 4:
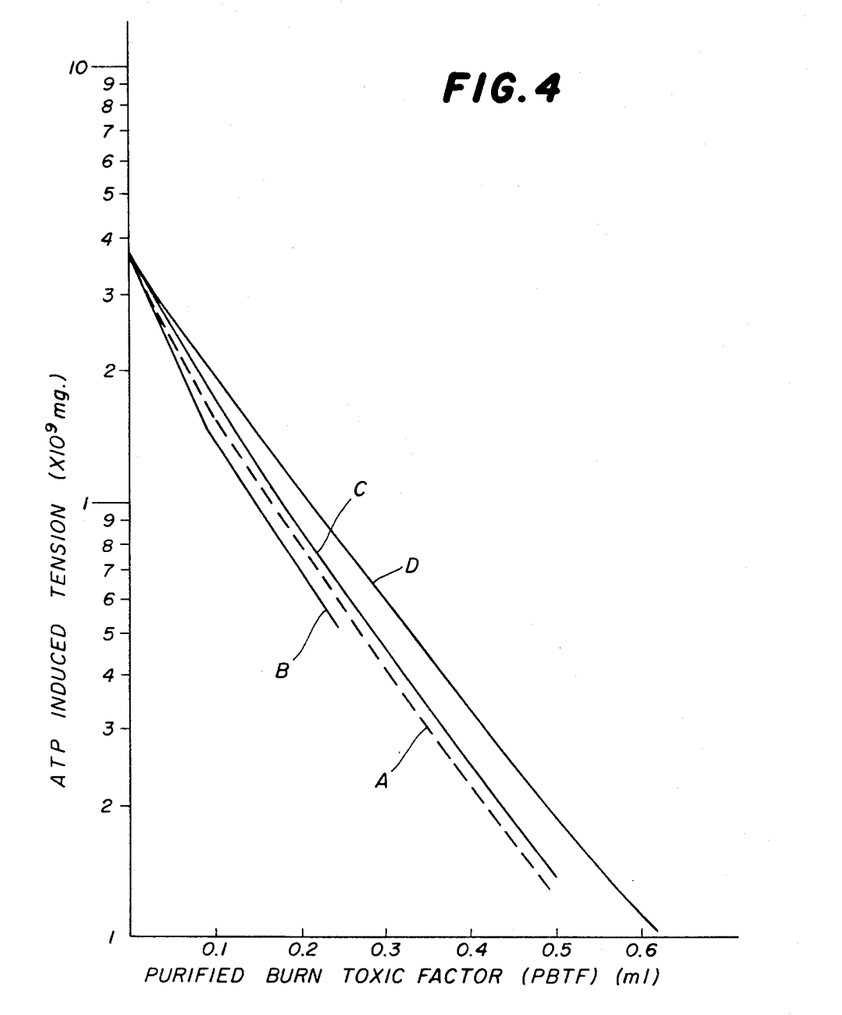
FIG. 4 is a chart of the effect upon ATP-induced tension of glycerinated psoas muscle after the addition thereto of purified burn toxic factor and various concentrations of the competitive inhibition agent derived therefrom.

This change in tension produced by the glycerinated psoas muscle in response to the addition of ATP after incubation with the varying amounts of purified burn toxic factor is graphically illustrated in FIG. 4 of the drawings, and specifically in the dashed line Curve A thereof. The ultimate tension produced by the muscle is plotted along the vertical axis on a logarithmic scale and the concentration of PBTF in the medium is plotted along the horizontal axis. There also is plotted in FIG. 4 the effect of adding various amounts of the competitive inhibition factor derived from PBTF to the medium containing the muscle. First of all it is pointed out that addition of the competitive inhibition factor derived from PBTF to the medium 5 minutes prior to the addition of ATP also inhibits the ATP-induced contraction of the muscle fiber, but the degree of inhibition was somewhat less than that produced by the PBTF. When the competitive inhibition factor of PBTF was added first, followed by the addition of PBTF and then addition of the ATP, the inhibition was reduced when the amount of competitive inhibition factor was 0.1 ml. and above. Referring to Curve B of FIG. 4, there is there illustrated the effect of adding 0.05 ml. of the competitive inhibition agent prior to the addition of PBTF; Curve C shows the effect of adding 0.1 ml. of the competitive inhibition agent prior to the addition of the PBTF, and Curve D shows the effect of adding 0.15 ml. of the competitive inhibition factor before adding the PBTF. From these curves of FIGS. 3 and 4, it is clear that the PBTF and the competitive inhibition factor derived therefrom act on the same site in the glycerinated psoas muscle fiber, which site is also that on which acts the ATP to induce tension in the muscle.

The process for purification of the burn toxin was carried out as described above in order to arrive at an essentially purified molecule of glycoprotein in order to establish the essential chemical characteristics thereof. In the further treatment of the glycoprotein such as by sonication, the molecule of glycroprotein was split to form a competitive inhibition agent or competition therefrom, this having been verified by the fact that the original single peak developed from the glycoprotein in the nuclear magnetic resonance analysis has been formed into two peaks for the competitin derived therefrom. The target cells for the glycoprotein were the muscle fibers of the heart (striated muscle) and the receptor sites were those acted upon by ATP. The burn toxin glycoprotein competed for this site with the competitin. Similarly, in vivo, competitin derived from the burn toxin protected animals (mice) against the lethal effects of the burn toxin.

It is to be understood that purified burn toxin and its competitin as described above were used only to investigate and establish the mechanism of operation thereof. Actually competitin formed from the crude burn toxin protected 90% of the animals (mice) against the lethal effects of the purified burn toxin, whereas competitin derived from the purified burn toxin protected 50% of the animals (mice).

The following are further processes of the present invention first to produce in vitro a toxic factor, and thereafter to produce in vitro from the toxic factor a competitive inhibition agent or competitin that inhibits the activity in vivo of the toxic factor.

EXAMPLE 3

Human skin tissue obtained either from autopsy or from surgery was frozen within five hours after the death of the individual or the part and stored at −20° C. until used. The skin tissue was dissected, full thickness skin, free from subcutaneous fat and cut into small fragments having dimensions on the order of from about 2 mm. to about 5 mm., the preferred size being 3 mm. to 4 mm. Fifty grams of the skin was thawed and placed in 100 ml. of a 0.9% sodium chloride aqueous solution (biological saline solution) and heated with continuous stirring to a temperature of 96° C. for 30 seconds. The suspension was then placed in a Waring blender and homogenized at 3,000 r.p.m. for 15 minutes. The homogenized mixture was then decanted through cheesecloth to remove extraneous material such as hair, and thereafter centrifuged at 1,600G (1,600 times the force of gravity) for 5 minutes at room temperature. There resulted three separate fractions, namely, a very thin light yellow fatty floating layer (Code 1), a pellet consisting mostly of large particles (Code 2), and a dominent supernatant middle layer (Code 3). The product identified as Code 3 was frozen at −20° C. for 48 hours and then thawed; after thawing, the tissue was then resuspended in a 0.9% sodium chloride aqueous solution so that the final suspension contained 10 mg. per ml. of total dry solids including the salts, and the mixture was rehomogenized in a fritted glass grinder. The homogenate was then centrifuged at 4,700G (4,700 times the force of gravity) and room temperature for 15 minutes to provide a supernatant liquid (Code 4) and a precipitate that was discarded.

The product identified above as Code 4 is a burn toxic factor which was demonstrated as described above with respect to Example 1.

The burn toxic factor identified as Code 3 resulting from Example 3 above was then treated by the following process to produce a competitive inhibition agent or competitin that inhibited the activity of the burn toxic factors Code 3 and Code 4 in vivo.

EXAMPLE 4

The product from Example 3 identified as Code 3 was frozen at −20° C. for 48 hours and then thawed, the particle size of the tissue at this time being on the order of 7 microns. After thawing, the tissue was then resuspended in 0.9% sodium chloride aqueous solution so that the final suspension contained 10 mg. per ml. total dry solids including the salts, and the mixture was rehomogenized in a fritted glass grinder. The resultant homogenate had applied thereto sonic energy from a Raytheon "Sonicator" operating at a frequency of 9,000 cycles persecond and a total energy output of 50 watts applied to the homogenate over an area of approximately 15 sq. cm. to produce an energy level of approximately 3 watts/sq. cm., the sonic energy being applied for one hour at a temperature of about 20° C. the homogenate was then centrifuged at 4,700G at room temperature to provide a supernatant liquid (Code 5) and a precipitate, the precipitate being discarded.

The product Code 5 is substantially non-lethal when injected into mice and in addition is a competitive inhibition agent or competitin which inhibits the activity of the burn toxic factors Code 3 and 4. The non-lethal character of the product Code 5 was tested by the intravenous injection thereof into male Swiss mice having weights in the range 18 to 20 grams, 135 mice being utilized in the test. The mice were injected intravenously into the lateral veins with 2.0 mg. of the product Code 5 dispersed in 0.2 ml. of 0.9% sodium chloride aqueous solution. The mortality of the mice was only 2.7% as contrasted with 87.7% mortality for a like injection of solutions containing like amounts by weight of the product Code 4. In many instances, the mice showed little or no signs of toxicity after being injected with the product Code 5 as described above.

The ability of the competitive inhibition agent Code 5 to inhibit the activity of the toxic factor Code 4 was also demonstrated by intravenous injections of male Swiss mice having a weight in the range 18 to 20 grams, 89 animals being tested in 9 separate experiments, i.e., 9 separate runs of the processes of Examples 1 and 2. The mice were first injected with the competitive inhibition agent Code 5 (0.2 mg. dispersed in 0.2 ml. of a 0.9% sodium chloride aqueous solution), and 30 minutes thereafter the same animals were injected with the toxic factor Code 4 (2.0 mg. dispersed in 0.2 ml. of 0.9% sodium chloride aqueous solution). In many of the experiments all of the animals survived, but in certain experiments some of the animals died. The overall lethality rate was 14.6%. As a rule, the animals showed no sign of ill effects when challenged with the lethal toxic factor Code 4, but in the case of certain animals there was a toxic effect.

In another group of mice, the toxic factor Code 4 was mixed in equal amounts with the competitive inhibit agent Code 5, and the mixture injected into the mice as described above. The lethality rate of the mice was on the order of 20% magnitude instead of 10% as set forth above. Finally, a third set of tests was conducted utilizing mice wherein the toxic factor Code 4 was first injected into the mice and immediately thereafter the competitive inhibition agent Code 5 was injected into the mice, the lethality rate of the mice in this test being substantially the same as in the preceeding two tests. In two other groups of mice, the competitive inhibition agent Code 5 was injected 24 hours and 48 hours respectively before challenged with the toxic factor Code 4 and the mice were protected in 80% to 90% of the cases. The competitive inhibition agent or competitin is equally effective when injected subcutaneously or intraperitoneally.

The competitive inhibition agent or competitin of Example 4 can be further purified by organic solvent extraction techniques, acetone extraction, petroleum ether extraction alcohol-ether extraction and butanol-acetic acid-water extraction being particularly useful. In purification by means of acetone extraction, to one volume of the product Code 5 was added two volumes of dry acetone at room temperature, and the resultant mixture shaken for ten minutes at room temperature and thereafter centrifuged at 500G for ten minutes. The supernatant acetone was collected and evaporated under vacuum to dryness and the dry material redissolved in physiological saline solution to make up one-half of the volume of the original Code 5. This product was tested for lethality and was found to be non-lethal in mice. The product from the acetone extraction also protected mice against injections of the toxic factor in the same manner as discussed above with respect to Example 2.

When using petroleum ether as the organic solvent for purification of the product Code 5, equal volumes of the product Code 5 and petroleum ether were shaken vigorously in a separatory funnel at a temperature of 30° C. to 60° C., and thereafter allowed to separate. The aqueous layer was reshaken with an equal volume of petroleum ether and the layers allowed to separate. The petroleum ether layers were combined and evacuated in vacuum to dryness and the dry material redissolved in physiological saline solution to make a volume one-quarter that of the original volume of the Code 5. The aqueous phase was also evaporated in vacuum to a small volume and the total volume made up to one-quarter of the original volume of the Code 5. Both the aqueous phase product and the petroleum ether phase product were non-lethal in mice and afforded protection against lethal injections of the toxic factor Code 4.

In purifying the product Code 5 with alcohol and ether, to a given volume of Code at a temperature of 4° C. were added three volumes of ethyl alcohol and one volume of ether previously mixed in a beaker and stirred with a rod for ten minutes and allowed to stand in the cold at 4° C. overnight and centrifuged at 4° C. for ten minutes at 3200G. The supernatant liquid was evaporated to dryness under vacuum and the dry material resulting was redissolved in physiological saline solution to make a volume equal to one-third of the original volume of the product Code 5. The extracted and purified Code 5 product was found to be non-lethal in mice and to afford protection against lethal dosages of the burn toxic factor Code 4.

In the butanol-acetic acid-water extraction purification of the product Code 5, to 20 ml. of the product Code 5 were added 4 ml. of glacial acetic acid and 20 ml. of butanol. The mixture was shaken vigorously for ten minutes at room temperature, then centrifuged at 500G for twenty minutes. The top butanol layer was withdrawn and there was then added to what remained 5 ml. of distilled water, 4 ml. of glacial acetic acid and 20 ml. of butanol, all being mixed vigorously at room temperature and then centrifuged at 500G for twenty minutes. The butanol layer and the aqueous layer were withdrawn and saved. All of the aqueous layers were pooled and further purified by paper chromatography. It was found that the first or uppermost bands were negative to the ninhydrin test and positive to diphenylamine and these bands when eluted with physiological saline solution provided a product which was non-toxic to mice yet protected against lethal injections of the toxic factor Code 4 in the same manner as did the product Code 5 discussed above with respect to Example 2.

The toxic factor Code 4 responded positively to the Orcinol test for polysaccharides, responded positively to the diphenylamine test for pentose sugars, responded positively to the Biuret reagent testing for proteins and amino acids and reacted positively when tested with Sudan Black reagent testing for lipoprotein.

The competitive inhibition agent Code 5 has been found to be heat stable, and for example is stable upon heating at 50° C. for 30 minutes and is stable upon heating at 96° C. for 10 minutes, whereby the product is sterilizable. The product Code 5 is not dialyzable against water or aqueous saline solution; it further has a neutral pH and is non-toxic and non-lethal when administered in substantial doses to test animals. The competitive inhibition agent Code 5 is slightly opalescent as produced by Example 3, but is crystal clear after being refined by extracting with a 40% or 80% acetone-water solution followed by evaporation and resuspension in saline solution. The product Code 5 is also crystal clear when extracted with equal parts of petroleum ether and water. The lipoprotein phase is also slightly opalescent. Finally, the competitive inhibition agent Code 5 is not inactivated by the enzymes trypsin and ribonuclease and has an ultraviolet absorption peak at 255–260 mm.

The competitive inhibition agent or competitin Code 5 responded positively to the Orcinol test for polysaccharides, responded positively to the diphenylamine test for pentose sugars, responded positively to the Biuret reagent testing for proteins and amino acids and reacted positively when tested when Sudan Black reagent testing for lipoprotein.

In the process of Example 3 above, the high temperature heating of the small sections of skin in the saline solution may be carried out at temperatures as low as 75° C. and even at temperatures above 96° C., but under the boiling point of the saline solution. It is preferred that at the lower temperatures, the heating time is extended beyond the 30 seconds utilized at 96° C., for example on the order of three minutes or more. In the homogenizing of the mixture of skin and saline solution, other equipment may be used in place of the Waring Blender given in Example 3, provided that a like degree of homogenizing action is obtained, it being understood that even when using the Waring Blender lower rates of blending may be utilized provided that the time of blending is correspondingly increased to provide the desired and necessary degree of homogenization. In the freezing of the product Code 3 in both Examples 3 and 2; it is preferred that a temperature of at least about −10° C. or lower be utilized, the preferred range being from about −18° C. to about −20° C.; times as short as 24 hours may be utilized and when the higher temperatures are utilized, it is desired to lengthen the time of freezing.

In the process of Example 4, it will be understood that other types of equipment may be utilized to provide the sonic energy applied to the homogenate. Further the time of exposure may be less than one hour, for example 15 minutes, but better results are obtained at the longer exposure times and even as long as several hours. The frequency of the sonic energy may be as low as 5,000 cycles per minute and may even be above the 20,000 cycles per second level and as high as 50,000 cycles per second and still produce good results. The sonic energy further may be applied to the homogenate at a temperature ranging from about 5° C. to about 50° C. and at an energy level from about one watt/sq.cm. to about 100 watts/sq.cm.

EXAMPLE 5

The process of Example 4 above was repeated utilizing the product Code 4, thereby to produce a competitive inhibition agent or competitin Code 5 that was indistinguishable from that produced in Example 4 and possessing all of the characteristics described above with respect to the competitive inhibition agent Code 5 of Example 4.

In another variation of the process of the present invention, the crude toxic factor Code 3 (which is highly toxic and lethal to mice and rabbits if given intravenously) was treated as described above with respect to Example 4, after which the product was non-toxic and non-lethal to mice and rabbits. By the injection of this product into rabbits intravenously, intraperitoneally, subcutaneously and in the foot pads, the resultant sera of the rabbits gave good precipitin titres against the burn toxic factor. Further it was found that when the sera from the rabbits were mixed with the crude burn toxic factor Code 3, the mixture also protected mice from a lethal dose of the burn toxic factor, the degree of protection being superior to that provided by sera from rabbits immunized with the crude burn toxic factor Code 3. The specially treated non-toxic competitive inhibition agent thus was superior to the original toxic and lethal crude burn toxic factor as an immunizing agent.

From the above, it will be seen that there has been provided a vaccine which contains both a toxic quantity of the burn toxic factor and a protective amount of the competitive inhibition agent formed from the burn toxic factor. Use of this vaccine in vivo serves to give immediate protection against the burn toxic factor, and further promotes in vivo in the production of antibodies for the burn toxic factor. It will be understood that the burn toxic factor present in the vaccine may be burn toxic factor that survived the process for producing the competitive inhibition agent and was recovered therewith, thus to provide a mixture of the competitive inhibition agent and the toxic quantity of the burn toxic factor. On the other hand, the vaccine can be made by providing first a relatively pure extract of the competitive inhibition agent and thereafter adding from another source a toxic quantity of the burn toxic factor, thus to provide a mixture of the burn toxic factor with the competitive inhibition agent. Both procedures for the preparation of the vaccine are satisfactory for the intended purpose.

The competitive inhibition agent or competitin Code 5 resulting from the processes of Examples 4 and 5 above should be useful if injected intravenously into human burn subjects to counteract the effects of burn toxic factors that are produced in the body as a result of burn injuries to the skin and other tissues of the body. Such intravenous injection of the competitive inhibition agent Code 5 would materially alleviate many of the undesirable after-effects experienced by such burn victims and would materially increase the recovery rate of the patient.

It will be understood that the process of Examples 1 and 3 above may be applied to other tissues to provide the corresponding tissue burn toxic factor; and thereafter that tissue burn toxic factor can be processed in accordance with Examples 2, 4 and 5 above to provide a competitive inhibition agent that inhibits the activity of that tissue injury toxic factor in vivo. Likewise, the various tissues including skin tissue may be injured in other ways such as cutting, freezing, exposure to destructive radiation and the like, thereby to provide the corresponding injury toxic factor; thereafter the latter tissue injury toxic factor may be processed in accordance with Examples 2, 4 and 5 above to produce a corresponding competitive inhibition agent that inhibits the activity in vivo of the latter tissue injury toxic factor.

The process of the present invention can be applied to toxins, such as bacterial toxins to produce in vitro the corresponding competition or competitive inhibition agent that reduces the activity or toxicity of the toxin in vivo, the following being a specific example thereof as applied to diphtheria toxin.

EXAMPLE 6

Standard diphtheria toxin was frozen at a temperature of −15° C. and was thereafter heated to 96° C. for one minute. The resultant material was then treated with sonic energy as in Examples 2, 4 and 5 above to provide a diphtheria competitin or competitive inhibition agent. The diphtheria competitin was then tested on male Swiss mice having a weight of 18 to 20 grams, all as described with respect to Examples 2 and 4, and it was found that the competitin protected all of the mice over a four day to two week period of isolation even when challenged with what would ordinarily be lethal doses of diphtheria toxin.

Other mechanical breaking schemes are useful in producing competitive inhibition agents or competitins from toxic factors or toxins in accordance with the present invention, the following, for example, illustrates use of a French press for this purpose.

EXAMPLE 7

A sample of the burn toxic factor Code 4 described above was placed in a French press and had applied thereto pressures in the range from about 15,000 p.s.i. to about 20,000 p.s.i. Thereafter the pressure was suddenly released and the effluent collected as the product or competitin. This competitin when tested on mice was found to be non-toxic yet protected the mice against lethal doses of the burn toxic factor Code 4.

Instead of the mechanical breaking of the toxic factor discussed above, enzymes may be used to break the toxic factors and thus to provide a competitin in accordance with the present invention, the following being two examples thereof.

EXAMPLE 8

Two ml. of the burn toxic factor Code 4 having a total solids content of 10 mg. per ml. were adjusted to a pH of 7.0, after which one mg. of the enzyme trypsin was added and the total volume made up to 4 ml. with physiological saline solution. The resultant mixture was incubated at 37° C. for five hours and then stored in the cold overnight. The resultant product was found to be non-lethal to mice and protected the mice against lethal intravenous injections of the burn toxic factor Code 4.

EXAMPLE 9

Two ml. of the burn toxic factor Code 4 having a total solids content of 10 mg. per ml. were adjusted to a pH of 7.0, after which one mg. of the enzyme collagenase was added and the total volume made up to 3 ml. with physiological saline solution. The resultant mixture was incubated at 37° C. for five hours and then stored in the cold overnight. The resultant product was found to be non-lethal to mice and protected the mice against lethal intravenous injections of the burn toxic factor Code 4.

The process of the present invention may be applied to other bacterial toxins to produce in vitro corresponding competitive inhibition agents that inhibit the activity or toxicity of the toxins in vivo, examples of such other bacterial toxins being the toxin of *Clostridium tetani* (agent of tetanus), *Clostridium botulinum*, type A (agent of botulism), etc.

The process of the present invention is also useful when applied to the venoms of snakes, and likewise is useful when applied to the venoms or poisons of other poisonous animals and insects, thereby to produce competitive inhibition agents or competitins that inhibit the activity in vivo of those various venoms and poisons.

The process of the present invention likewise is useful in producing competitive inhibition agents or competitins that are effective in preparing the ground for encouraging the retention of tissue transplants in animals, for example, the transplant of skin tissue, aorta tissue, bone tissue, etc.

The process of the present invention has also been successfully utilized in producing competitive inhibition agents or competitins from liver tissue.

The process of the present invention also is useful in producing competitive inhibition agents or competitins effective in combating the growth and proliferation of cancer tissue. The following is an example thereof:

EXAMPLE 10

Normal Swiss mice (18 to 20 grams) were inoculated subcutaneously with a suspension of cancerous tissue (sarcoma 180) taken from other mice. After 10 to 15 days when the local tumors had reached sizes well over 15 mm. in diameter, they were dissected out excluding skin, fat, muscle and other extraneous tissue, and frozen at −20° C. for 48 hours. The tumors were then thawed and cut into small pieces of the order of about 2 mm. The cancerous tissue was then heated, homogenized, filtered, centrifuged, frozen, thawed, homogenized, centrifuged and sonicated for 1 hour using the procedures described above with respect to Examples 3 and 4. There resulted a competitive toxic factor or competitin obtained from the cancerous tissue.

The physiological effect of the competitive inhibition agent from cancerous tissue was then checked by injecting normal Swiss mice (18 to 20 grams) with cancerous tissue as described above, 13 mice being injected. After 10 days the tumors had grown to approximately 10 to 15 mm. in diameter. Nine of the mice were injected subcutaneously or intravenously twice weekly with 0.2 ml. of the competitive inhibition factor derived from the cancerous tissue. The other four mice were given 0.2 ml. of physiological saline solution intravenously or subcutaneously. After four weeks it was found that of the nine mice receiving injections of the competitive inhibition agent, three of the mice had had the lesions thereon reduced in size from 10 to 15 mm. to a size 0 to 4 mm. in diameter; three of the mice had the lesions unchanged in size; and three of the mice had the lesions increased in diameter to 16 to 20 mm. The four control mice receiving physiological saline solution had the tumors increase in diameter to a size in the range 16 to 20 mm. Accordingly, the competitive inhibition agent inhibited further growth of tumors in 33% of the cases, producing the size of the tumors in 33% of the cases and had no effect on the growth of the tumors in the remaining cases.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. A process for producing in vitro a competitive inhibition agent for inhibiting bacterial toxin, said process comprising the steps of freezing a bacterial toxin selected from the group consisting of diphtheria toxin and tetanus toxin and botulism toxin at a temperature of about −10° C. and below, forming a solution of the bacterial toxin in an aqueous carrier and heating the solutions to a temperature in the range from about 75° C. to about 100° C. for at least about 30 seconds, subjecting the suspension to sonic energy at a frequency in the range from about 5,000 cycles per second to about 50,000 cycles per second, the sonic energy being applied to the solutions at a temperature in the range from about 5° C. to about 50° C. for a time interval of at least about 15 minutes and at an energy level of at least about 1 watt/sq. cm., and thereafter recovering the competitive inhibition agent from the solutions.

2. The process for producing in vitro a competitive inhibition agent as set forth in claim 1, wherein the bacterial toxin is frozen for at least about 24 hours.

3. The process for producing in vitro a competitive inhibition agent as set forth in claim 1, wherein the sonic energy is applied for a time interval of from about 15 minutes to about 2 hours.

4. The process for producing in vitro a competitive inhibition agent as set forth in claim 1, wherein the sonic energy is applied at an energy level of from about 1 watt/sq. cm. to about 100 watts/sq. cm.

5. A competitive inhibition agent for inhibiting the action in vivo of a bacterial toxin, said competitive inhibition agent being formed in vitro by freezing a bacterial toxin selected from the group consisting of diphtheria toxin and tetanus toxin and botulism toxin at a temperature of about −10° C. and below, forming a solution of the bacterial toxin in an aqueous carrier and heating the suspension to a temperature in the range from about 75° C. to about 100° C. for at least about 30 seconds, subjecting the solution to sonic energy at a frequency in the range from about 5,000 cycles per second to about 50,000 cycles per second, the sonic energy being applied to the solution at a temperature in the range from about 5° C. to about 50° C. for a time interval of at least about 15 minutes and at an energy level of at least about 1 watt/sq. cm., and thereafter recovering the competitive inhibition agent from the solution.

No references cited.

RICHARD L. HUFF, Primary Examiner

U.S. Cl. X.R.
424—195, 95, 98